Jan. 29, 1924.   1,482,375
F. E. PERNOT ET AL
MEANS FOR EFFECTING PHASE ADJUSTMENT OF ELECTRICAL SYSTEMS
Filed Feb. 15, 1923    2 Sheets-Sheet 1
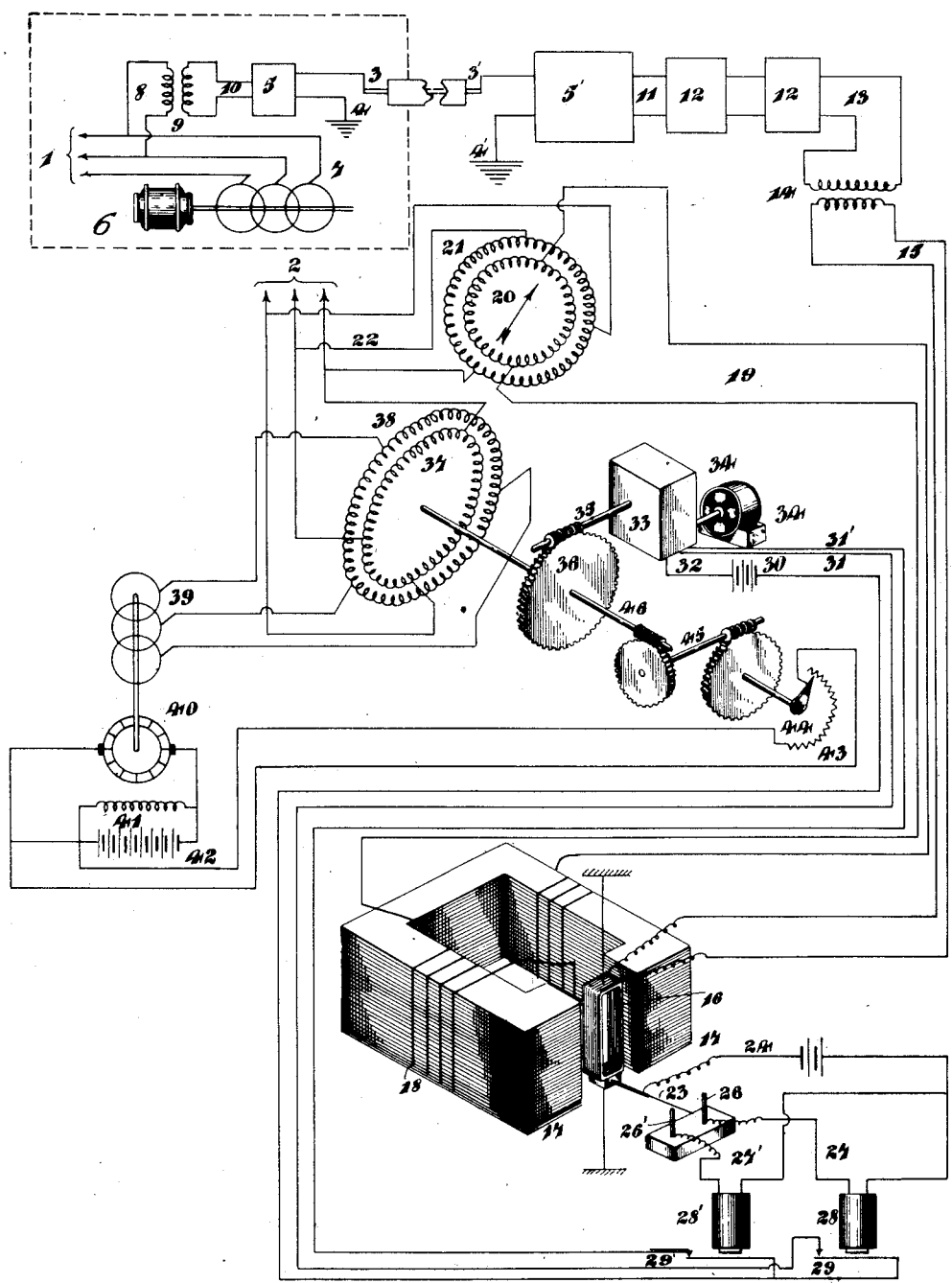
INVENTORS:
Frederick E. Pernot
Lester J. Rich
BY Wm Wallace White
ATTY.

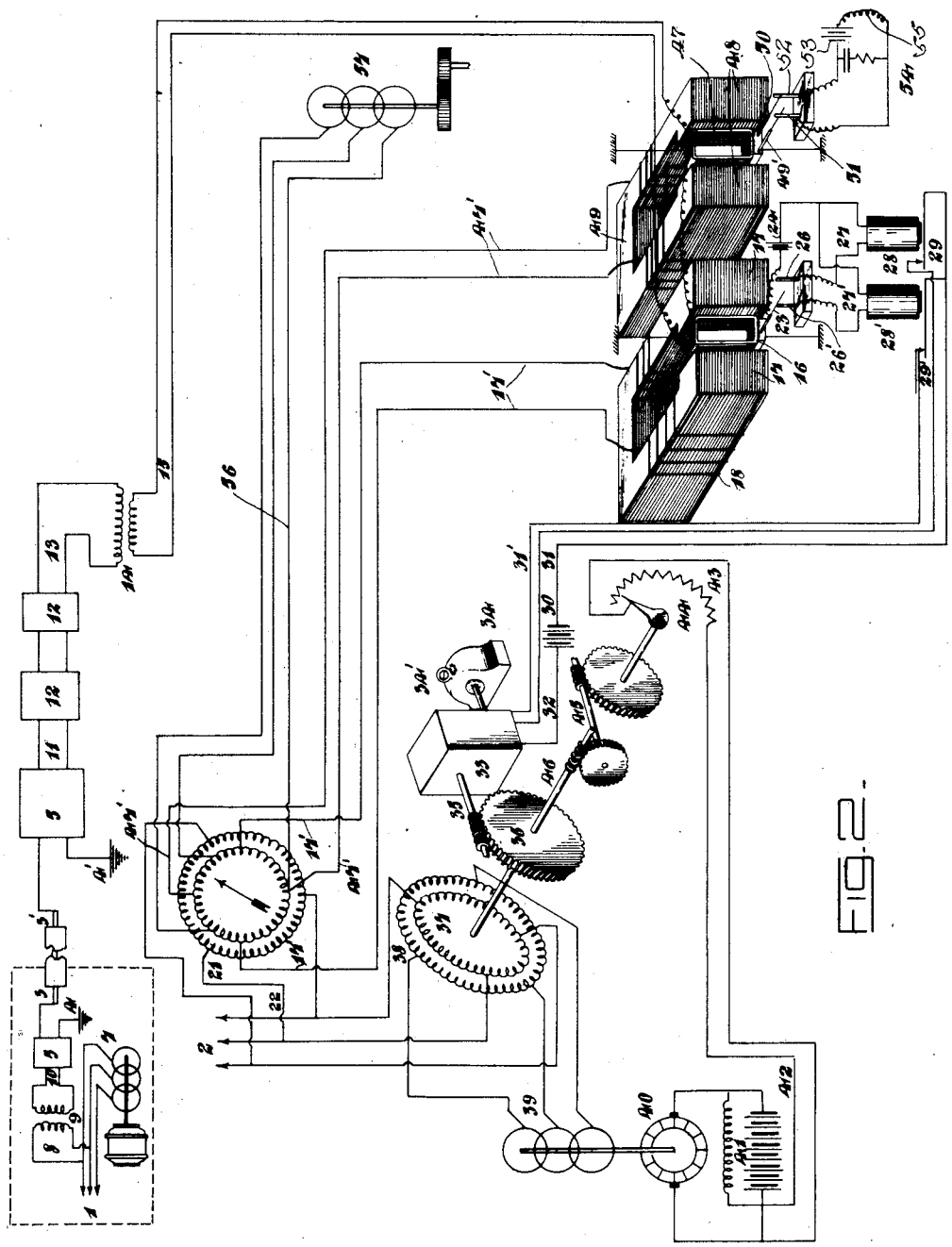

Patented Jan. 29, 1924.

1,482,375

UNITED STATES PATENT OFFICE.

FREDERICK EUGENE PERNOT, OF LONDON, ENGLAND, AND LESTER JACOB RICH, OF THE EASTERN TELEGRAPH COMPANY LIMITED, MALTA.

MEANS FOR EFFECTING PHASE ADJUSTMENT OF ELECTRICAL SYSTEMS.

Application filed February 15, 1923. Serial No. 619,261.

*To all whom it may concern:*

Be it known that we, FREDERICK EUGENE PERNOT, citizen of the United States of America, residing at 70 Porchester Terrace, London, England, and LESTER JACOB RICH, citizen of the United States of America, residing at c/o Messrs. The Eastern Telegraph Company Limited, Malta, have invented Improvements in Means for Effecting Phase Adjustment of Electrical Systems, of which the following is a specification.

This invention relates to new or improved means for maintaining synchronism and substantial constancy of relative phase position between two or more alternating-current systems and rotating or other moving apparatus involved therewith, and has particular reference to those systems wherein an alternating current produced by one of the systems is used to control the frequency and phase of alternating currents produced in other systems.

The present invention is particularly well adapted for use in those cases where only a minute amount of power is available from one system for controlling the frequency and phase of one or more other systems and has, therefore, particular although not exclusive reference to those cases where the systems are far apart and the power from one system is transmitted over a submarine cable, long telegraph line or the like or by radio-electric waves modulated by one of the alternating-current systems which are then received, rectified and used to control the frequency and phase of another system, or systems.

The principal feature of this invention resides in the employment of a phase correcting device whose function is to maintain within definite limits the difference in phase between two alternating-current systems which would be produced continuously by a small difference in frequency between the two systems.

Another feature of the invention is the utilization of the movements of the phase correcting device to control the frequency of the dependent system so as to keep it as nearly as possible equal to that of the primary or controlling system and thereby require of the phase correcting device a minimum of action.

Another feature of the invention is found in the method whereby sluggishness of action on the part of the phase corrector is avoided and the correction thus made to begin and end at the time required.

A still further feature of the invention resides in the use of an alternating-current galvanometer to detect the difference in phase between the two systems and by its actions to bring into play the phase corrector.

Still another feature of the invention is found in the utilization of the control current for the transmission of signals simultaneously with its use as a control for phase.

Still another feature of the invention is found in the provision of a phase shifting apparatus either between the received control current and the galvanometer or between the controlled system and the galvanometer field so that the datum of phase difference between the two systems about which the galvanometer begins to act can be controlled at will.

Alternatively to the feature last mentioned the phase shifting transformer there mentioned may be placed between the output of the frequency- and phase-controlled generating system and any synchronous motor driven therefrom, so that the datum point for phase for the individual motor may be controlled instead of the similar control previously described for the total output. This permits of individual adjustment of each piece of apparatus driven from the output of the main generating system.

In order that the invention and its mode of application may be readily understood by persons skilled in the art, reference will now be made to the accompanying drawings, wherein:—

Figure 1 illustrates diagrammatically one embodiment of this invention and Fig. 2 illustrates diagrammatically further embodiments. In the diagrams the invention is shown as applied to a submarine cable for the purpose of controlling the speeds of apparatus located at the two ends of the cable, and by such synchronous operation of the machinery for the handling of messages transmitted by any of the well known means, a more certain and rapid operation of the message transmitting and receiving systems is rendered possible. It is to be understood, however, that there is no intention to limit the application of the invention to such use only. It may be used in connection with radio telegraphy for similar purposes, or with any kind of transmission system for the synchronous driving of clocks, so that one master clock at the transmitting station is made to accurately regulate any number of other clocks driven by synchronous motors or the like from such frequency- and phase-controlled electrical systems.

In Figure 1, 1 represents the terminals of a three-phase alternating-current system at one end of the cable, and 2 represents the terminals of a three-phase alternating-current system at the other end of the cable. The function of the present embodiment of the invention is to ensure that synchronism is maintained between these two systems, so that any apparatus driven by synchronous motors from these systems will run at exactly the same speed and with substantial constancy in relative phase position. 3 and 3' are the two ends of the cable. 4 and 4' are the respective earth connections. 5 and 5' represent en bloc the assembly of apparatus normally employed in causing the cable to transmit messages, and is well known in the art. 6 is a prime mover of any description which drives a three-phase alternating-current generator 7. The prime mover 6 establishes the frequency to which the entire system is made to adjust itself, and therefore it is made to be governed as carefully and precisely as the requirements of the situation may dictate. The output of the alternator 7 is taken by way of the terminals 1 to drive synchronous motors involved in the assembly of message handling machinery 5. One phase of the alternator is connected by leads 8 to a transformer 9, and thence by way of leads 10 single phase power is fed through the apparatus 5 and finally to the cable 3 and earth 4. A continuously alternating current is thus supplied to the cable in addition to such other currents as are used to transmit messages. Such a frequency must, therefore, be selected for the alternating current that interference be not produced. The alternator 7 is made polyphase so that synchronous motors may be more easily driven by its output.

At the other end of the cable the terminal apparatus 5' which may be of any approved type delivers the very weak alternating current by way of the leads 11 to the amplifiers 12 and thence through leads 13 to the transformer 14. From the transformer 14 the current is delivered by leads 15 to the delicately hung coil 16 of a galvanometer. So far we have only described how the alternating current is supplied to the cable and then amplified and delivered to the galvanometer. It is from this point that the several novel features of the invention are to be found. To clearly understand the action of the system, let it be remembered that the moving coil 16 carries a current of the same frequency as that available at the terminals 1 at the other end of the cable; it is in fact current derived from those terminals, having been transmitted over the cable and then amplified.

If between the poles 17 of the magnet embracing the coil 16 there exists an alternating magnetic field of the same frequency as the current in the coil 16, then under one particular condition the coil 16 will not be acted upon by an average deflecting force; and this condition is when the current in the coil is in time-phase quadrature with the magnetic field. A double-frequency torque is exerted under such a condition, but the inertia of the coil prevents response to this. The alternating magnetic field between the poles 17 is produced by an alternating current in the windings 18, supplied over conductors 19 from the secondary of a phase shifting transformer 20. The primary 21 of this phase shifting transformer is fed by conductors 22 from the terminals 2 of the three-phase alternating-current system at this end of the cable, and which in the manner about to be described is maintained in substantially constant phase relation to the similar alternating-current system terminating at 1 at the other end of the cable.

Suppose that the current in windings 18 as supplied through the phase shifting transformer lags a little behind that phase position for which the current in coil 16 is in quadrature with the magnetic field between the poles 17. Then the coil will be acted upon by an average force in one direction which is effective in overcoming the inertia of the coil, and the coil is consequently deflected in one direction. Similarly, if the magnetic field is made to lead slightly from its quadrature position the coil is made to deflect in the opposite direction. Deflections of the coil in one direction or the other thus correspond to change in phase between the systems terminating at 1 and 2 respectively. The function of the phase shifting transformer 20, 21 is to make it possible to select at will that particular phase relation between 1 and 2 for which no deflection of the coil is produced; it normally stands in some fixed position after being adjusted by hand to give the desired phase relation.

Now, it is the function of the moving coil 16 to deflect because of slight variations in phase, and by its deflection to bring into play such mechanism or actions as to reduce the displacement in phase which originally caused its movement. Attached to the coil 16 is a contact or relay tongue which say, as is common in similar types of relay mechanisms, consists of a fine gold wire or the like. This relay tongue 23 (antenna it is commonly called) has its movement in either direction limited by the contact butts 26 and 26' which may be of platinum or other suitable metal. By means of a connection 24 to the antenna 23, the battery 25, and the connections 27 and 27' from the respective butts 26 and 26' it is seen that when the antenna makes contact with butt 26 a current is established through magnet 28, and similarly when the antenna makes contact with butt 26' a current is established in magnets 28'.

The movements of the armatures of the magnets 28 and 28' control respective relay contacts 29 and 29', which by means of the common lead 32 and the battery 30 supply current over either conductor 31 or 31' as the case may be to the device 33. The device 33 is a reversing clutch of any usual or approved type, such as a planetary gear system with its brake bands controlled by the actions of electromagnets, or a double disk friction clutch with the position of the intermediate contact wheel controlled by the operation of electro-magnets, or the ordinary reversing cone clutch commonly used on line shafting in machine shops. This reversing clutch is interposed between the continuously rotating shaft 34' of a motor or other prime mover 34 and a worm 35. It is so arranged that current supplied over lead 31 by the operation of relay 28 causes the worm 35 to rotate in one direction, and when current is supplied over lead 31' by the operation of relay 28' the worm rotates in the other direction. The worm communicates its motion to a worm wheel 36 attached by a shaft to the rotating member of a phase shifting transformer 37, and therefore this rotatable secondary 37 revolves in one direction or the other depending upon which butt 26 or 26' the antenna 23 makes contact with. The terminals 2 of the phase and frequency controlled alternating-current system at this end of the cable are taken from this secondary 37.

The primary 38 of the above phase shifting transformer is supplied from a polyphase alternator 39, and this alternator is driven by a motor or other prime mover in lieu of a motor 40. Taking this prime mover to be a direct-current motor as shown in the figure supplied with power from the battery or other sources 42, its field 41 may be controlled by a rheostat 43 and the motor speed thereby regulated. The movable arm 44 of the rheostat 43 is actuated through a gear train 45 by the shaft 46 of the worm wheel 36 and phase shifting transformer 37.

Finally, the manner of action of the entire system is this: Beginning with the alternator 39 running at exactly the right speed and with its output 2 in exactly the right phase position with respect to the output 1 at the other end of the cable, something happens to make the motor 40 drop in speed momentarily. The phase of the output 2 thus drops behind the phase of 1 so that the current in coil 16 of the relay is no longer in quadrature with the magnetic field about it. It deflects, therefore, making contact between the antenna and butt 26, say. In the manner described this starts the worm to rotate and by rotating the phase shifting transformer 37 advances the phase of the output 2 until the original correct phase position is attained, whereupon the deflection of coil 16 ceases and everything is as before except that through the action of the gear train 45 the rheostat arm 44 has been moved by a minute amount—not enough, however, to be appreciable in its effect on the motor speed. Similarly, something causes the motor 40 to run a little too fast for a moment. The phase of the output 2 is advanced thereby, thus causing the coil 16 to deflect in a direction opposite to that in the preceding instance, and contact is made between the antenna and butt 26'. This causes the worm 35 to rotate in an opposite direction and through the phase shifting transformer 37 to retard the phase of the output 2 until it is put right and the effect of the momentary change in speed of the alternator 39 is obliterated. The rheostat arm 44 is moved in an opposite direction by a minute amount, more or less neutralizing the previous minute movement.

But now, something more series occurs than a mere momentary fluctuation in speed. Something causes the motor to steadily run more slowly. According to the foregoing the relay coil 16 deflects and causes the phase shifting transformer 37 to correct the phase. The continued slow motion of the motor 40 again demands a correction, and so on, corrections are being made continuously. With every correction made, however, the rheostat arm is moved slightly, and although each movement corresponding to a single deflection is insufficient to appreciably alter the speed of the motor 40 controlled by this rheostat, the cumulative effect of a number of such motions gradually makes a change in the rheostat resistance sufficient to bring the motor speed back to normal, whereupon no more corrections are required.

In other words, the arrangement shown imposes on the phase shifting transformer 37 as controlled by the reversing gear 33 the task of correcting for all incidental changes in phase, and this can be done effectively because the motor 34 is running continuously, and the only inertia of consequence to be overcome before phase correction begins or ends is that of the small shaft and worm 35, and even this is negligible.

It is this property of being able to respond almost instantaneously to the demands represented by the motions of the antenna 23 to or from the butts 26 and 26' that marks the improvement of the invention here described over any system wherein correction to phase is obtained by altering the speed of the generating source. In the present method, however, the corrections to phase are integrated by the gear train 45 and through the medium of the rheostat 43 the necessity for continually repeated correction in one direction is eliminated.

It is obvious that the principles involved in the above embodiment may be incorporated in numerous forms different from those shown, and the statement of invention as presented here is to be interpreted to comprehend such modified forms for carrying the principles into effect. For example, instead of using a phase shifting transformer as at 37 and 38 for correcting the phase, the stator of the alternator 39 may be made rotatable and the phase correction made by rotating it, in response to the action of the deflection of the coil 16. A still further alternative arrangement is to drive the alternator through a train of differential gearing, the phase adjustment being effected by rotating the ring carrying the idler pinions.

Although a worm and worm wheel has been shown as the preferred method for driving the corrective rotating members there is no intent to limit the invention to such a method. The combination of a worm and worm wheel is particularly well adapted to taking up the torque exerted on the rotating member 37 even when it is not being rotated. Still further, the integrated correction derived through the medium of the gear train 45 need not necessarily control a rheostat. If the prime mover 40 be something other than an electric motor, then in place of the rheostat and sliding arm 43 and 44 there must be provided some other kind of mechanism suited to the kind of prime mover adopted, and the methods used for governing the speed thereof.

Again, the phase shifting transformer 20 and 21 need not be placed between the phase-corrected output 2 and the relay field 18. The field 18 may be taken directly from the mains 2, and the hand adjustment to phase dispensed with. Again, the equivalent to the hand adjustment to phase may be placed between the output mains 2 and any machine driven synchronously therefrom, so that a plurality of such synchronously driven machines may be adjusted in phase separately.

Again, in place of the reversing clutch mechanism 33, the worm might be connected directly to the small motor 34 and in some cases a sufficiently rapid action secured by allowing the relays 29 and 29' to start and stop the running of the motor, the one in one direction and the other in the opposite direction.

A preferred type of relay is shown at 28 and 28', but there are numerous forms well known in the art which would serve the purpose in hand. Relays are employed here only because the antenna 23 and its contact with the butts 26 is not adequate to carry the considerable currents necessary to operate a clutch 33.

The motor 34 may be driven either from the alternator 39 as an induction or as a synchronous motor, or it may be driven by separately supplied electric power, or it may even be dispensed with and the shaft 34' driven by direct mechanical connection to the motor and alternator system, 40 and 39.

Finally, the alternating current transmitted over the cable and after magnification caused to flow in coil 16, can simultaneously with its use as a phase and synchronism-maintaining current, be used to convey messages. If the speeds of the two motors 6 and 40 be carefully adjusted and maintained by usual types of governing devices, then there will not be very frequent demands upon the phase correcting mechanism just described. The alternating current over the cable may therefore be interrupted for brief intervals, say a quarter of a second, and during that time no serious change of phase can take place. This brief interruption can just as well form one element of a signalling code as can the brief period of current transmission commonly used. The current is maintained normally in steady flow, and signals are formed by brief interruptions. Such signals can be received in a variety of ways, but only one embodiment is illustrated herewith in Figure 2 of the drawings.

In such latter figure the invention is shown as applied to submarine cable telegraphy the speed control being identical with that shown in Figure 1 and the like parts in Figures 1 and 2 are represented by the same reference numerals.

The current transmitted by alternator 7 and transmitted over the cable 3 passes through coil 16 embraced by the poles 17 of the galvanometer which functions substantially as hereinbefore described with reference to Figure 1.

In series with the coil 16 is a coil 47 embraced by the poles 48 of a second galvanometer 49 which latter galvanometer is conveniently of similar construction to the galvanometer functioning to control the speed and output of the alternator 39.

For the purpose of simultaneously receiving signals and controlling the speed and output of the dependent alternator from one and the same source of supply it is preferable that, as previously stated, the signals can be formed by interruptions in the signal current.

For the attainment of this it will be necessary to maintain the magnetic fields of the two galvanometers in time phase quadrature so that while current is flowing and the dependent alternator is being controlled by coil 16 and associated parts, coil 47 is continuously deflected and no signal recorded.

In the arrangement illustrated herewith and for the attainment of this result the magnets embracing the coil 16 and the magnets embracing the coil 47 are both energized from the same phase shifting transformer, the leads 17' for the winding of magnet 17 being taken from the secondary 20 and the leads 47' from the winding of magnet 47 being also taken from such secondary 20 and adjacent leads 17' and 47' being displaced ninety electrical degrees relative to one another as shown.

Coil 47 is furnished with two antenna 49' and 50 which respectively make contact with butts 51 and 52. When current from the distant controlling station is passing through coil 47 there is a continuous deflection of the coil and current from battery 53 in relay circuit 54 continues to flow in such circuit by virtue of the contact made between antenna and butt.

Immediately current ceases to flow through the coil 47 the coil loses its deflection and one of the antenna breaks contact with its respective butt thereby breaking the relay circuit 54 which break is recorded, conveniently through the medium of apparatus 55 representing, for example a further relay circuit.

In addition to functioning as a means for controlling the dependent alternator simultaneously with the reception of signals the system above described may conveniently be utilized for controlling the synchronous running of one or more electric motors and the like.

In the particular embodiment shown in Figure 2 leads 56 are taken from the secondary 20 of the phase shifting transformer to a synchronous motor or the like represented at 57. In this way running machinery and the like at the dependent end of the system may be made to synchronize with one another and with machinery at the controlling end of the system.

We claim:—

1. The combination with a plurality of sources of alternating E. M. F. of which at least one is controlled by another and is dependent thereon, of means for maintaining synchronism and controlling the relative phase position of the E. M. Fs. which comprises, an alternating current galvanometer, having a field winding energized by the dependent source and a coil energized by the controlling source, a phase shifting transformer connected between the dependent source and the galvanometer field winding, and means whereby said galvanometer controls the phase shifting effect of said transformer.

2. The combination as set forth in claim 1, in which the dependent source comprises an alternator, of a variable speed motor driving said alternator, and means whereby the speed of said motor is varied simultaneously with the control of the phase shifting transformer.

3. The combination as set forth in claim 1, in which the dependent source comprises an alternator and a direct current motor driving said alternator, a resistance in the field circuit of said motor and means for varying said resistance simultaneously with the control of the phase shifting transformer.

FREDERICK EUGENE PERNOT.
LESTER JACOB RICH.